Patented June 5, 1928.

1,672,156

UNITED STATES PATENT OFFICE.

WILLY O. HERRMANN AND WOLFRAM HAEHNEL, OF MUNICH, GERMANY, ASSIGNORS TO CONSORTIUM FUR ELEKTROCHEMISCHE INDUSTRIE, OF MUNICH, GERMANY.

PROCESS FOR THE PREPARATION OF POLYMERIZED VINYL ALCOHOL AND ITS DERIVATIVES.

No Drawing. Application filed July 17, 1925, Serial No. 44,410, and in Germany July 19, 1924.

Our invention relates to the preparation of a polymer of vinyl alcohol. It has not been possible hitherto to isolate vinyl alcohol because the vinyl alcohol itself is not a stable compound. The chemical reactions which might be expected to yield vinyl alcohol result in the formation of acetaldehyde, an isomer of the vinyl alcohol, or of its derivatives.

We have found that the vinyl alcohol can be obtained in a polymerized form corresponding to the formula $(CH_2:CHOH)_n$. This polymer has the typical properties of an alcohol and undergoes the reaction which would be expected of an alcohol. This polymer of vinyl alcohol can be obtained by polymerizing vinylic compounds and decomposing the polymerized vinylic compounds by the action of alkaline reagents. The polymerized vinyl alcohol thus produced can be transformed in known ways to other derivatives typical of alcohols such as esters, ethers, alcoholates and the like.

Polymerized vinyl acetate on treatment with alcoholic potash gives directly the polymerized vinyl alcohol $(CH_2:CHOH)_n$ as a voluminous powder.

The following examples show how our invention may be carried out but our invention is not limited to them. In the examples we start from the polymerized vinylic compounds which can be manufactured from the unpolymerized vinylic compound by any known method, for example, by polymerizing the vinyl compound with the aid of benzoyl peroxide with or without pressure.

Example I.

60 grams of potassium hydroxide are dissolved in 50 grams of ethyl alcohol in a vessel equipped with a stirrer. To this solution are added with thorough agitation 80 grams of ground polymerized vinyl acetate. After agitating about half an hour the precipitated polymer of vinyl alcohol is separated on a filter and dried.

Example II.

100 grams of polymerized vinyl propionate are dissolved in 150 grams of ethyl alcohol and the solution slowly added with stirring to a solution of 65 grams potassium hydroxide in 500 grams ethyl alcohol. Polymerized vinyl alcohol precipitates as in 1 and may be collected on a filter and dried.

The mechanism of the reactions may be represented by the following equations in which number one represents the formation of the polymer of the vinyl ester and number two represents the decomposition or hydrolysis of this polymer.

1. 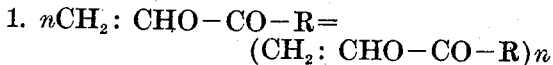

$$nCH_2:CHO-CO-R = (CH_2:CHO-CO-R)n$$

2. 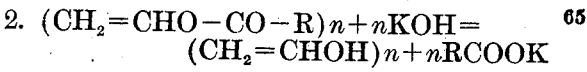

$$(CH_2=CHO-CO-R)n + nKOH = (CH_2=CHOH)n + nRCOOK$$

where R represents any organic radical.

This polymer of vinyl alcohol is a water soluble powder without odor, of white color and has the formula of: $(CH_2:CHOH)n$. Determinations of the molecular weight according to the osmotic pressure method gave figures between 780 and 870 according to a formula of:

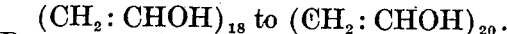

$$(CH_2:CHOH)_{18} \text{ to } (CH_2:CHOH)_{20}.$$

By evaporating a watery solution of this polymerized vinyl alcohol films or sheets of extremely high elasticity and strength can be obtained.

Derivatives of this polymer of vinyl alcohol can be produced in the following manner:

1. By treating polymerized vinyl alcohol with butyric acid anhydride a neutral butyrate results. This is a caoutchouc like body which at ordinary temperature gives elastic threads and on stretching forms elastic membranes. It is soluble in alcohol. If instead of butyric acid anhydride an excess of butyric acid is applied a partially esterified polymer of vinyl alcohol is obtained which is harder than the first product but very elastic.

2. By means of the Schotten-Baumann esterification reaction (see Houben Weyl II, 2, page 501) polymerized vinyl alcohol can be transformed into the benzoate compound. This has a yellowish white color, and is insoluble in alcohol.

3. If polymerized vinyl alcohol is melted with an equivalent quantity of aleuritinic acid or of trioxystearic acid an aleuritinate or trioxystearate results. Both are very hard and elastic products, nearly insoluble in most solvents.

4. By mixing together glycollic acid dissolved in water with an equivalent amount of polymerized vinyl alcohol dissolved in water, evaporating the water and fusing in vacuum, vinylic glycollate is obtained. This glycollate is a very elastic product, soluble in ammonia and in pyridine.

5. By evaporating a solution of polymerized vinyl alcohol in water containing an equivalent amount of sodium hydroxide a caoutchouc-like mass is obtained which when exposed to the air effloresces forming a white product. This substance is the sodium alcoholate of the vinyl alcohol.

What we claim is:

1. A process for the preparation of polymerized vinyl alcohol which consists in polymerizing vinyl esters and treating the polymerized vinyl ester with an alkaline reagent.

2. A process for the preparation of polymerized vinyl alcohol which consists in treating a polymerized vinyl ester with an alkaline reagent.

3. A process for the preparation of polymerized vinyl alcohol which consists in polymerizing vinyl esters and treating the polymerized vinyl ester with sodium hydroxide.

4. A process for the preparation of polymerized vinyl alcohol which consists in treating a polymerized vinyl ester with sodium hydroxide.

5. A process for the preparation of polymerized vinyl alcohol which consists in polymerizing vinyl esters and treating the polymerized vinyl ester with an alkaline reagent in an alcoholic medium.

6. A process for the preparation of polymerized vinyl alcohol which consists in treating a polymerized vinyl ester with an alkaline reagent in an alcoholic medium.

7. A process for the preparation of polymerized vinyl alcohol which consists in polymerizing vinyl esters and treating the polymerized vinyl ester with sodium hydroxide in an alcoholic medium.

8. A process for the preparation of polymerized vinyl alcohol which consists in treating a polymerized vinyl ester with sodium hydroxide in an alcoholic medium.

9. As a product of manufacture, polymerized vinyl alcohol formed by polymerizing vinyl esters and treating the polymerized vinyl ester with sodium hydroxide.

10. As a product of manufacture polymerized vinyl alcohol formed by treating a polymerized vinyl ester with sodium hydroxide.

11. As a product of manufacture polymerized vinyl alcohol.

Dr. WILLY O. HERRMANN.
Dr. WOLFRAM HAEHNEL.